(12) United States Patent
Inomata

(10) Patent No.: US 10,879,002 B2
(45) Date of Patent: Dec. 29, 2020

(54) CERAMIC CAPACITOR AND MANUFACTURING METHOD THEREOF

(71) Applicant: TAIYO YUDEN CO., LTD., Tokyo (JP)

(72) Inventor: Yasuyuki Inomata, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 139 days.

(21) Appl. No.: 16/198,162

(22) Filed: Nov. 21, 2018

(65) Prior Publication Data

US 2019/0172640 A1  Jun. 6, 2019

(30) Foreign Application Priority Data

Dec. 4, 2017 (JP) .................................. 2017-232539

(51) Int. Cl.
  *H01G 4/12* (2006.01)
  *H01G 4/30* (2006.01)
  *H01G 4/248* (2006.01)
  *H01G 4/012* (2006.01)
  *H01G 4/224* (2006.01)

(52) U.S. Cl.
  CPC ............. *H01G 4/1227* (2013.01); *H01G 4/30* (2013.01); *H01G 4/012* (2013.01); *H01G 4/224* (2013.01); *H01G 4/248* (2013.01)

(58) Field of Classification Search
  CPC ........ H01G 4/1227; H01G 4/30; H01G 4/012; H01G 4/224; H01G 4/248
  See application file for complete search history.

(56) References Cited

U.S. PATENT DOCUMENTS

| | | | | |
|---|---|---|---|---|
| 4,461,844 | A | * 7/1984 | Itakura | H01G 4/1227 361/321.5 |
| 6,268,054 | B1 | * 7/2001 | Costantino | C01G 23/006 428/403 |
| 2008/0266751 | A1 | * 10/2008 | Yamazaki | C04B 35/62815 361/321.4 |
| 2011/0122541 | A1 | * 5/2011 | Nakamura | H01G 4/30 361/321.4 |
| 2019/0348222 | A1 | * 11/2019 | Kato | H01G 4/1227 |

FOREIGN PATENT DOCUMENTS

| JP | S6076028 A | 4/1985 |
|---|---|---|
| JP | H01220422 A | 9/1989 |
| JP | H0837126 A | 2/1996 |

* cited by examiner

*Primary Examiner* — Dion Ferguson
(74) *Attorney, Agent, or Firm* — Law Office of Katsuhiro Arai

(57) ABSTRACT

A ceramic capacitor includes: a dielectric layer of which a main component is a ceramic grain, wherein one or more pores are formed inside of the ceramic grains; and wherein an area ratio of the one or more pores with respect to a cross section of the ceramic grain is 0.03% to 0.20%, in a cross section of the dielectric layer.

4 Claims, 5 Drawing Sheets

US 10,879,002 B2

CERAMIC CAPACITOR AND MANUFACTURING METHOD THEREOF

CROSS-REFERENCE TO RELATED APPLICATION

This application is based upon and claims the benefit of priority of the prior Japanese Patent Application No. 2017-232539, filed on Dec. 4, 2017, the entire contents of which are incorporated herein by reference.

FIELD

A certain aspect of the present invention relates to a ceramic capacitor and a manufacturing method thereof.

BACKGROUND

There is disclosed a technology in which internal electrodes are connected in series in order to improve voltage resistance of a ceramic capacitor (for example, see Japanese Patent Application Publication No. S60-76028 and Japanese Patent Application Publication No. H1-220422). There is disclosed a technology in which the number of internal electrode patterns connected in series is four or more and a breakdown voltage is improved (for example, see Japanese Patent Application Publication No. H8-37126).

SUMMARY OF THE INVENTION

The series pattern of the internal electrodes reduces a voltage applied between capacitors. Therefore, the series pattern is effective against increasing of the breakdown voltage. However, when the series structure is used, a capacity may be reduced. Increasing of the number of the internal electrodes connected in series is effective against increasing of the voltage resistance. However, loss of an effective cross section area may increase. And the capacity may be reduced more.

The present invention has a purpose of providing a ceramic capacitor and a manufacturing method of the ceramic capacitor that are capable of suppressing capacity reduction and improving voltage resistance.

According to an aspect of the present invention, there is provided a ceramic capacitor including: a dielectric layer of which a main component is a ceramic grain, wherein one or more pores are formed inside of the ceramic grains; and wherein an area ratio of the one or more pores with respect to a cross section of the ceramic grain is 0.03% to 0.20%, in a cross section of the dielectric layer.

According to an aspect of the present invention, there is provided a manufacturing method of a ceramic capacitor including: forming a green sheet by using ceramic slurry including a first ceramic powder formed by a hydrothermal synthesis method and a second ceramic powder formed by a method other than the hydrothermal synthesis method; and firing the green sheet.

DETAILED DESCRIPTION

A description will be given of an embodiment with reference to the accompanying drawings.

EMBODIMENT

Figure 1:
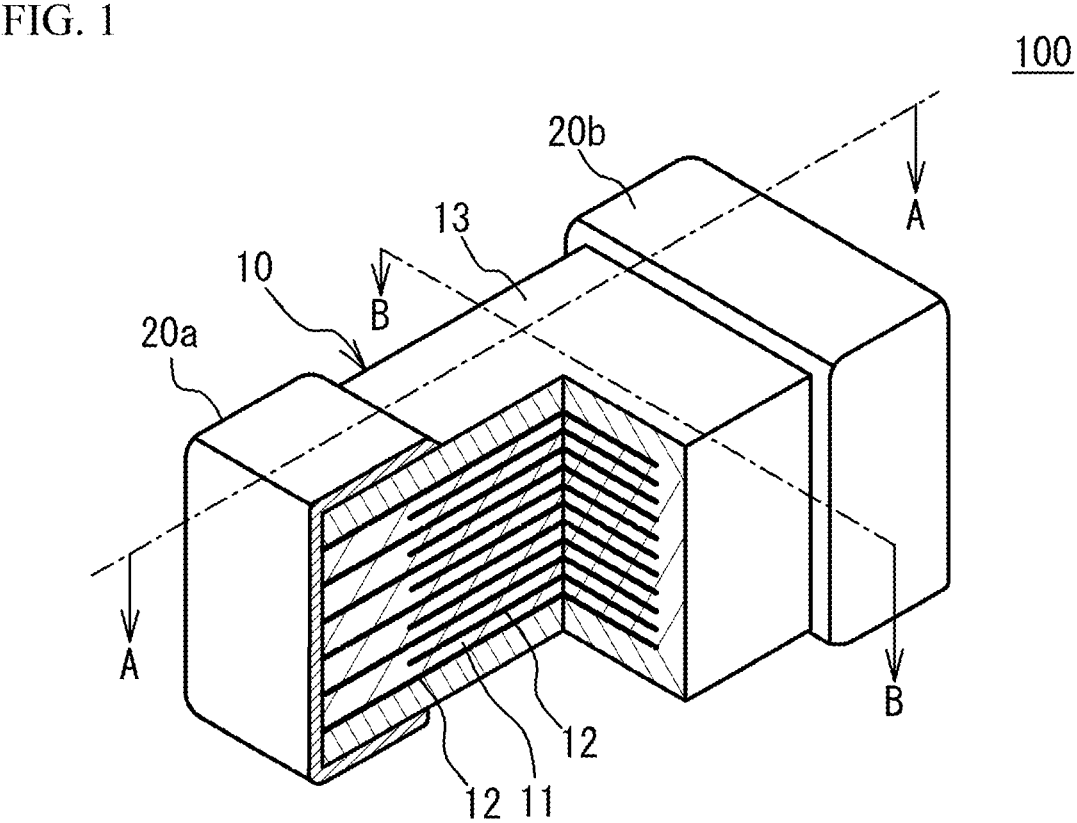
FIG. 1 illustrates a partial perspective view of a multilayer ceramic capacitor.
Figure 2:
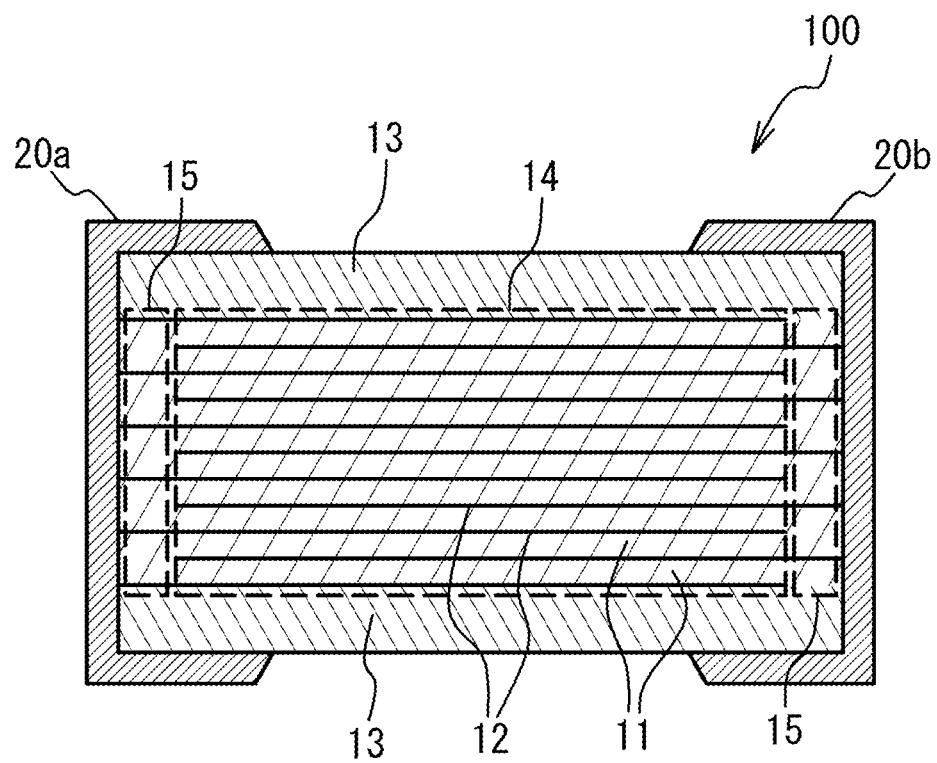
FIG. 2 illustrates a cross sectional view taken along a line A-A of FIG. 1.
Figure 3:
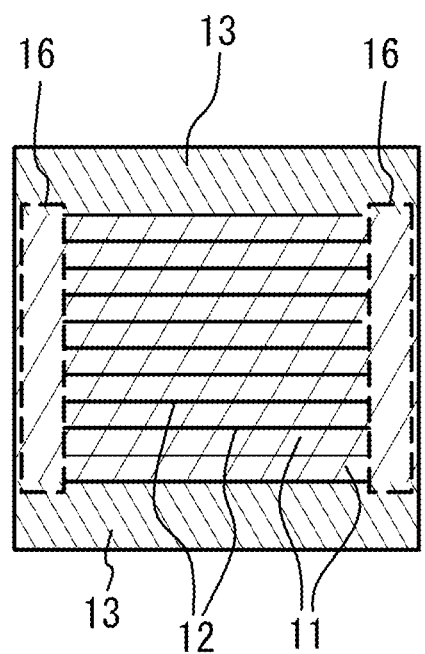
FIG. 3 illustrates a cross sectional view taken along a line B-B of FIG. 1.

FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1, 0 \leq y \leq 1, 0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces. The side margin region 16 does not generate electrical capacity. In the following description, the cover layers 13, the end margin region 15 and the side margin region 16 may be called as a non-capacity region.

A description will be given of downsizing of the multilayer ceramic capacitor 100 and capacity enlargement of the multilayer ceramic capacitor 100. Generally, a capacity C is expressed by the following formula (1). "$\varepsilon_0$" is a dielectric constant of vacuum. "$\varepsilon_r$" is a relative dielectric constant of the material of the dielectric layer 11. "S" is an effective cross section area of the internal electrode layers 12. The effective cross section area is a total value of facing areas of two internal electrode layers 12 next to each other in the capacity region 14. "n" is a stacking number of the dielectric layers 11. "t" is a thickness of the dielectric layer 11.

$$C = \varepsilon_0 \times \varepsilon_r \times S \times n/t \quad (1)$$

From the formula (1), it is possible to downsize the multilayer ceramic capacitor 100 and enlarge the capacity of the multilayer ceramic capacitor 100, by using a material of which a relative dielectric constant is larger than that of the dielectric layer 11 (method 1), enlarging the effective cross section area of the internal electrode layers 12 (method 2), or reducing the thickness of the dielectric layers 11 and increasing the number of the stacked dielectric layers 11 (method 3).

The voltage resistance is one of indices of the quality of the multilayer ceramic capacitor 100. The voltage resistance is an index indicating whether a voltage at which insulation breakdown occurs is high or low in a case where a voltage is applied to the multilayer ceramic capacitor 100. The voltage resistance is generally determined from the condition of the dielectric layer 11. However, as the capacity increases, influence of structure elements of the multilayer ceramic capacitor 100 is larger than that of materials of the multilayer ceramic capacitor 100.

For the purpose of enlarging the capacity of the multilayer ceramic capacitor 100, it is preferable that a ferroelectric material having a high dielectric constant is used as a material of the dielectric layer 11. However, the ferroelectric material is also a piezoelectric material. Therefore, the ferroelectric material extends when a direct voltage is applied to the ferroelectric material. Due to the extension of the dielectric layer 11, a displacement difference occurs between the capacity region 14 and the non-capacity region. When a crack occurs because of the displacement difference, the voltage resistance of the multilayer ceramic capacitor 100 may be degraded. In this case, breakdown may occur at a voltage lower than an original voltage resistance of the material.

The method 1 to the method 3 are studied again. In the method 1, a piezoelectric constant indicating a piezoelectric displacement is a function of a dielectric constant. Therefore, when the dielectric constant of the material of the dielectric layer 11 is increased, the piezoelectric constant is increased. Therefore, when the method 1 is used, a piezoelectric crack tends to occur. Next, in the method 2, when the effective cross section area of the internal electrode layers 12 is enlarged, the volume of the non-capacity region is reduced. In this case, tensile stress applied to the non-capacity region increased, and the piezoelectric crack tends to occur. Next, when the stacking number of the dielectric layers 11 is increased by using the method 3, the extension of the multilayer ceramic capacitor 100 is increased. Therefore, the piezoelectric crack tends to occur.

In this manner, the method 1 to the method 3 for increasing the capacity of the multilayer ceramic capacitor 100 increase the piezoelectric displacement and reduces the breakdown voltage. This is introduced from the following formulas (2) and (3). "$\Delta L$" is a piezoelectric displacement. "V" is a voltage applied to the dielectric layer 11. "$d_{33}$" is a piezoelectric constant. "$k_{33}$" is an electromechanical coupling factor. "$\varepsilon_{33}$" is a linear dielectric constant.

$$\Delta L = d_{33} \times V \times n \quad (2)$$

$$d_{33} = k_{33} \times (\varepsilon_{33} \times S_{33})^{1/2} \quad (3)$$

In the technologies of Japanese Patent Application Publication No. S60-76028, Japanese Patent Application Publication No. H1-220422 and Japanese Patent Application Publication No. H8-37126, the series structure of internal electrode layers is used. Therefore, the capacity is reduced. When the number of internal electrodes layers connected in series is increased, the loss of the effective cross section area increases and the capacity may be reduced more. And so, the multilayer ceramic capacitor has a structure for suppressing the capacity reduction and improving the voltage resistance.

From the study of the present inventors, when a ratio of pores in a main component ceramic of the dielectric layers 11 in the capacity region 14 is adjusted, the reduction of the dielectric constant of the dielectric layers 11 is suppressed and the crack caused by the piezoelectric extension is suppressed. A detailed mechanism may be unknown. However, it is thought that suppression of piezoelectric distortion caused by the pore inside of the ceramic grain achieves suppression of the crack.

Figure 4:
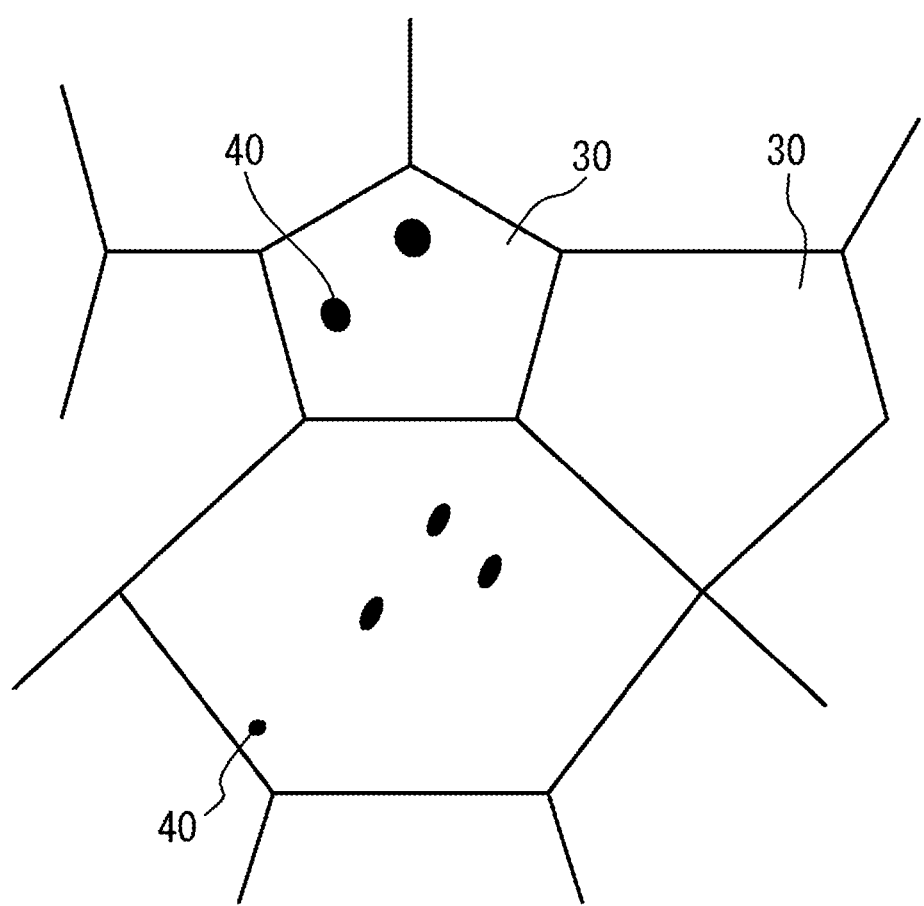
FIG. 4 illustrates ceramic grains in a dielectric layer.

FIG. 4 illustrates ceramic grains 30 in the dielectric layer 11. As illustrated in FIG. 4, the dielectric layer 11 includes one or more ceramic grains 30 as a main component. The ceramic grains 30 include pores 40 inside thereof.

When a ratio of the pores 40 in the ceramic grain 30 in the dielectric layer 11 is excessively small, a crack tends to occur in the dielectric layer 11 because of a piezoelectric extension and a breakdown voltage of the multilayer ceramic capacitor 100 is not sufficiently large. And so, in the embodiment, the ratio of the pores 40 in the ceramic grain 30 in the dielectric layer 11 has a lower limit. In concrete, an area ratio of a total cross section of the pores 40 with respect to a total cross section of the ceramic grain 30 is 0.03% or more in the cross section of the dielectric layer 11 (a cross section in a stacking direction). For the purpose of improving the piezoelectricity, it is preferable that the area ratio is 0.08% or more. It is more preferable that the area ratio is 0.10% or more. It is possible to calculate the area ratio from a TEM (Transmission Electron Microscope) image of the cross section of the dielectric layer 11. It is possible to calculate the area ratio by using an image processing software and obtaining a total of a cross section area of pores in ceramic grains and a cross section area of the ceramic grains from ten fields of a TEM image that are taken with, for example, 50000 magnifications to 100000 magnifications and are not overlapped with each other.

Next, when the ratio of the pores 40 in the ceramic grain 30 in the dielectric layer is excessively large, the dielectric constant of the dielectric layer 11 is reduced and the electrostatic capacity of the multilayer ceramic capacitor 100 is not sufficiently large. And so, in the embodiment, the ratio of the pores 40 in the ceramic grain 30 in the dielectric layer 11 has an upper limit. In concrete, the area ratio of the total cross section of the pores 40 with respect to the total cross section of the ceramic grain 30 is 0.20% or less in the cross section of the dielectric layer 11 (a cross section in a stacking direction). For the purpose of sufficiently suppressing the reduction of the electrostatic capacity, it is preferable that the area ratio is 0.15% or less.

The ceramic grain 30 may include a first ceramic grain including the pore 40 and a second ceramic grain not including the pore 40. In this case, when a ratio of the first ceramic grain is excessively small, the sufficient effect of improvement of the voltage resistance may not be necessarily achieved. On the other hand, when the ratio of the first ceramic grain is excessively large, capacity reduction may occur. And so, when a total of the first ceramic grains and the second ceramic grains is 100 vol % in the dielectric layer 11, it is preferable that the ratio of the first ceramic grains is 10 vol % or more and 80 vol % or less and the ratio of the second ceramic grains is 20 vol % or more and 90 vol % or less. It is more preferable that a ratio of vol % of the first ceramic grains/vol % of the second ceramic grains is 50/50 to 80/20. "not including the pore 40" means that the ratio of the pores 40 is 0.01% or less. It is possible to calculate the vol % by using an image processing software, obtaining a ratio of a cross section area of an objective grain from ten fields of a TEM image that are taken with, for example, 50000 magnifications to 100000 magnifications and are not overlapped with each other and raising the ratio to the power of 3/2.

Figure 5:
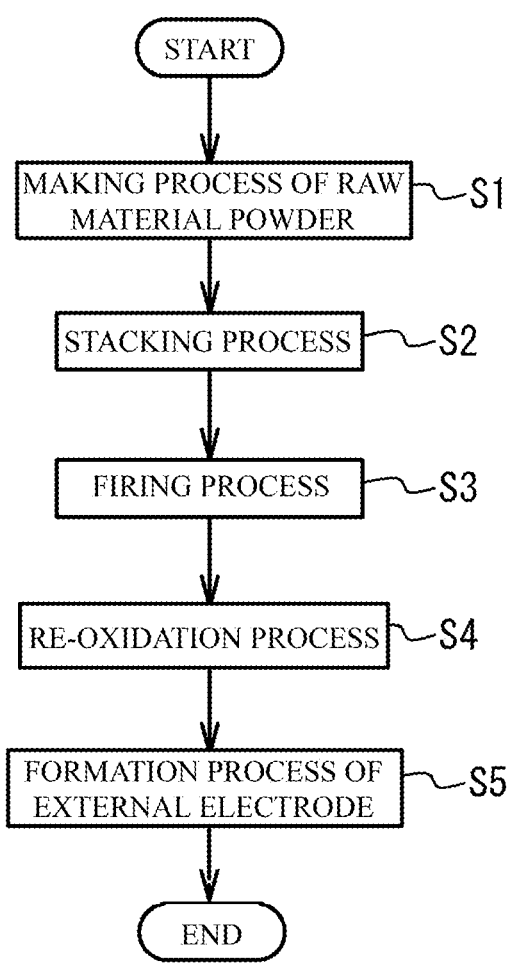
FIG. 5 illustrates a flow of a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layer 11 is prepared. Generally, an A site element and a B site element are included in the dielectric layer 11 in a sintered phase of grains of $BaTiO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used.

In the embodiment, a first ceramic powder is formed by a hydrothermal synthesis method. And a second ceramic powder is formed by a synthesis method other than the hydrothermal synthesis method such as a solid-phase synthesis method or a sol-gel synthesis method. The first ceramic powder and the second ceramic powder are mixed with each other. Thus, a desirable ceramic powder is obtained. In the hydrothermal synthesis method, barium titanate is formed by heating barium hydroxide and hydrate salt of metatitanic acid ($TiO(OH)_2$) in a normal atmosphere. In the hydrothermal synthesis method, a pore occurs in a region where OH is removed. Therefore, a pore exists in a ceramic grain of the first ceramic powder. In the solid-phase synthesis method, barium titanate is formed by solid-reacting titanium dioxide and barium carbonate. In the sol-gel method, barium titanate is formed by mixing a gel of barium hydroxide and a sol of titanium, drying the gel and the sol and calcining the gel and the sol. A pore hardly occurs in the ceramic grain in the synthesis method other than the hydrothermal synthesis method. Therefore, the ceramic grain of the second ceramic powder does not include the pore. "not including the pore" means that a ratio of the pore inside of the ceramic grain is 0.01% or less.

Additive compound may be added to the resulting ceramic powder in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon), or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives and are dried and crushed. Thus, a ceramic powder is obtained. For example, it is preferable that an average grain diameter of the resulting ceramic powders is 50 nm to 300 nm from a viewpoint of thickness reduction of the dielectric layer 11. For example, the grain diameter may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a stripe-shaped dielectric green sheet with a thickness of 3 μm to 10 μm is coated on a base material by, for example, a die coater method or a doctor blade method, and then dried.

Then, a pattern of the internal electrode layer 12 is provided on the surface of the dielectric green sheet by printing a conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked dielectric green sheets and under the stacked dielectric green sheets. The resulting multilayer structure is cut into a predetermined size (for example, 1.0 mm×0.5 mm).

(Firing process) The binder is removed from the resulting compact in $N_2$ atmosphere of a temperature range of 250 degrees C. to 500 degrees C. After that, the resulting compact is fired for ten minutes to 2 hours in a reductive atmosphere of which an oxygen partial pressure is $10^{-5}$ to $10^{-8}$ atm in a temperature range of 1100 degrees C. to 1300 degrees C. Thus, each compound of the dielectric green sheet is sintered and grown into grains. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Forming process of external electrodes) A conductive paste for forming the external electrodes 20a and 20b is coated on both edge faces of the sintered structure. The conductive paste may include Cu. The conductive paste is fired in nitrogen atmosphere at a temperature (for example, approximately 800 degrees C. to 900 degrees C.) lower than the temperature of the firing. Thus, the external electrodes 20a and 20b are bonded to the sintered structure. After that, by a plating process, a metal such as Cu, Ni or Sn may be coated on the external electrodes 20a and 20b.

In the manufacturing method of the embodiment, the green sheet including the first ceramic powder formed by the hydrothermal synthesis method and the second ceramic powder formed by the synthesis method other than the hydrothermal synthesis method is fired. When the first ceramic powder formed by the hydrothermal synthesis method is used, the pore 40 occurs inside of the ceramic grain 30 of the dielectric layer 11. When the second ceramic powder formed by the synthesis method other than the hydrothermal synthesis method is used, it is possible to adjust the ratio of the pores 40 in the ceramic grain 30. It is therefore possible to suppress the capacity reduction of the multilayer ceramic capacitor 100 and improve the voltage resistance of the multilayer ceramic capacitor 100.

It is preferable that the making process of raw material powder and the firing process are performed so that the area ratio of a total cross section of the pores 40 with respect to the total cross section of the ceramic grain 30 is 0.03% or more and 0.20% or less in the cross section of the dielectric layer 11 (the cross section in the stacking direction). It is more preferable that the making process of raw material powder and the firing process are performed so that the area ratio of a total cross section of the pores 40 with respect to the total cross section of the ceramic grain 30 is 0.08% or more and 0.15% or less in the cross section of the dielectric layer 11 (the cross section in the stacking direction). It is still more preferable that the making process of raw material powder and the firing process are performed so that the area ratio of a total cross section of the pores 40 with respect to the total cross section of the ceramic grain 30 is 0.10% or more and 0.15% or less in the cross section of the dielectric layer 11 (the cross section in the stacking direction).

In the making process of raw material powder, it is preferable that the first ceramic powder of 10 vol % to 80 vol % and the second ceramic powder of 20 vol % to 90 vol % are mixed when the total amount of the first ceramic powder and the second ceramic powder is 100 vol %. It is more preferable that the ratio of the vol % of the first ceramic powder/the vol % of the second ceramic powder is 50/50 to 80/20.

The embodiment focuses on the multilayer ceramic capacitor. However, the embodiment may be applied to a ceramic capacitor of which the number of the dielectric layer is one.

EXAMPLES

The multilayer ceramic capacitors in accordance with the embodiment were made. And, property of the multilayer ceramic capacitors was measured.

Examples 1 to 8 and Comparative Examples 1 to 3

The first ceramic powder that was barium titanate formed by the hydrothermal synthesis method (powder formed by the hydrothermal synthesis) and the second ceramic powder that was barium titanate formed by the solid-phase synthesis method (powder formed by the solid-phase synthesis method) were mixed. An average grain diameter of the powder formed by the hydrothermal synthesis and the powder formed by the solid-phase synthesis was 200 nm. In the example 1, the ratio of the powder formed by the hydrothermal synthesis was 10 vol % and the ratio of the powder formed by the solid-phase synthesis was 90 vol %. In the example 2, the ratio of the powder formed by the hydrothermal synthesis was 20 vol % and the ratio of the powder formed by the solid-phase synthesis was 80 vol %. In the example 3, the ratio of the powder formed by the hydrothermal synthesis was 30 vol % and the ratio of the powder formed by the solid-phase synthesis was 70 vol %. In the example 4, the ratio of the powder formed by the hydrothermal synthesis was 40 vol % and the ratio of the powder formed by the solid-phase synthesis was 60 vol %. In the example 5, the ratio of the powder formed by the hydrothermal synthesis was 50 vol % and the ratio of the powder formed by the solid-phase synthesis was 50 vol %. In the example 6, the ratio of the powder formed by the hydrothermal synthesis was 60 vol % and the ratio of the powder formed by the solid-phase synthesis was 40 vol %. In the example 7, the ratio of the powder formed by the hydrothermal synthesis was 70 vol % and the ratio of the powder formed by the solid-phase synthesis was 30 vol %. In the example 8, the ratio of the powder formed by the hydrothermal synthesis was 80 vol % and the ratio of the powder formed by the solid-phase synthesis was 20 vol %. In the comparative example 1, the powder formed by the hydrothermal synthesis was not used and the ratio of the powder formed by the solid-phase synthesis was 100 vol %. In the comparative example 2, the ratio of the powder formed by the hydrothermal synthesis was 90 vol % and the ratio of the powder formed by the solid-phase synthesis was 10 vol %. In the comparative example 3, the ratio of the powder formed by the hydrothermal synthesis was 100 vol % and the powder formed by the solid-phase synthesis was not used.

$Ho_2O_3$, MgO, $MnCO_3$, $V_2O_5$ and $SiO_2$ were weighed, were wet-blended with the resulting barium titanate powder, and were sufficiently crushed by a ball mill. Thus, the dielectric material was obtained. Butyral acting as an organic binder, and toluene and ethyl alcohol acting as a solvent were added to the dielectric material. A dielectric green sheet was formed by a doctor blade method so that the thickness of the dielectric layers 11 became 7 μm. A conductive paste for forming an internal electrode was screen-printed on the resulting dielectric sheet. 100 numbers of sheets on which the conductive paste for forming an internal electrode were stacked. Cover sheets were stacked on a lower face and an upper face of the stacked sheets. The thickness of the cover sheets was 200 μm. After that, a multilayer structure was obtained by a thermo compression bonding. And the resulting multilayer structure was cut into a predetermined shape. After removing the binder in a $N_2$ atmosphere, the resulting multilayer structure was fired at a temperature of 1250 degrees C. in a reductive atmosphere ($O_2$ partial pressure: $10^{-5}$ to $10^{-8}$ atm). And sintered multilayer structure was formed. The sintered multilayer structure had a length of 3.1 mm, a width of 1.6 mm and a height of 0.85 mm. After re-oxidation of the sintered multilayer structure in $N_2$ atmosphere at a temperature of 800 degrees C., Cu paste was coated on both edge faces and was fired. After the firing, the thickness of the dielectric layer 11 was 5 μm and the thickness of the internal electrode layer 12 was 0.8 μm.

(Analysis) An electrostatic capacity of each of the multilayer ceramic capacitors of the examples 1 to 8 and the comparative examples 1 to 3 was measured by an LCR meter under a condition of 1 kHz-1 Vrms. A TEM observation was performed in order to confirm the ratio of the pores 40 in the ceramic grain 30 of the dielectric layer 11. And, the area ratio of the pores 40 was calculated by using TEM images. A voltage was applied to both terminals of each of the multilayer ceramic capacitor at a room temperature with an increasing speed of 100 V/s. A voltage at which a short occurred was defined as the breakdown voltage. The breakdown voltage was measured by a voltage resistance meter. The example of which the electrostatic capacity was more than 1100 nF and of which an average of the breakdown voltages was more than 800 V was determined as good (circle or triangle). The example of which the electrostatic capacity was more than 1100 nF and of which the average of the breakdown voltages was more than 950 V was determined as specifically good (circle). "1100 nF" was determined so that a capacity of approximately 90% or more with respect to the electrostatic capacity of the comparative example 1 could be remained. The average of the breakdown voltages was an average of 30 samples.

Table 1 shows measured results. As shown in Table 1, in the comparative example 1, an average of the breakdown voltages was not sufficiently large. It is thought that this was because the ratio of the pores 40 in the ceramic grain 30 was 0.01% which was a small value. In the comparative examples 2 and 3, an electrostatic capacity was not sufficiently large. It is thought that this was because the ratio of the pores 40 in the ceramic grain 30 was 0.30% and 0.42% that were high values. On the other hand, in the examples 1 to 8, the average of the breakdown voltages was sufficiently large and the electrostatic capacity was sufficiently large. It is thought that this was because the ratio of the pores 40 in the ceramic grain 30 was 0.03% to 0.20%. In the examples 5 to 8, the breakdown voltage was 950 V or more. It is thought that this was because the vol % ratio of the powder formed by the hydrothermal synthesis method/the powder formed by the solid-phase synthesis method was 50/50 to 80/20.

TABLE 1

| | POWDER FORMED BY HYDROTHERMAL SYNTHESIS (vol %) | POWDER FORMED BY SOLID-PHASE SYNTHESIS (vol %) | ELECTROSTATIC CAPACITY (nF) | PORE RATIO (%) | AVERAGE OF BREAKDOWN VOLTAGES (V) | DETERMINATION |
|---|---|---|---|---|---|---|
| EXAMPLE 1 | 10 | 90 | 1205 | 0.03 | 800 | Δ |
| EXAMPLE 2 | 20 | 80 | 1200 | 0.05 | 810 | Δ |
| EXAMPLE 3 | 30 | 70 | 1190 | 0.07 | 828 | Δ |
| EXAMPLE 4 | 40 | 60 | 1185 | 0.08 | 830 | Δ |
| EXAMPLE 5 | 50 | 50 | 1190 | 0.10 | 960 | ○ |
| EXAMPLE 6 | 60 | 40 | 1180 | 0.15 | 1000 | ○ |
| EXAMPLE 7 | 70 | 30 | 1160 | 0.17 | 1040 | ○ |
| EXAMPLE 8 | 80 | 20 | 1140 | 0.20 | 1060 | ○ |
| COMPARATIVE EXAMPLE 1 | 0 | 100 | 1210 | 0.01 | 740 | X |
| COMPARATIVE EXAMPLE 2 | 90 | 10 | 1100 | 0.30 | 1100 | X |
| COMPARATIVE EXAMPLE 3 | 100 | 0 | 1005 | 0.42 | 1120 | X |

Although the embodiments of the present invention have been described in detail, it is to be understood that the various change, substitutions, and alterations could be made hereto without departing from the spirit and scope of the invention.

What is claimed is:
1. A ceramic capacitor comprising:
   a dielectric layer of which a main component is a ceramic grain,
   wherein one or more pores are formed inside of the ceramic grains; and wherein an area ratio of the one or more pores with respect to a cross section of the ceramic grain is 0.03% to 0.20%, in a cross section of the dielectric layer.

2. The ceramic capacitor as claimed in claim 1, wherein the dielectric layer includes a first ceramic grain including a pore inside thereof and a second ceramic grain not including a pore.

3. The ceramic capacitor as claimed in claim 2, wherein a ratio of the first ceramic grain is 10 vol % or more and 80 vol % or less, when a total of the first ceramic grain and the second ceramic grain in the dielectric layer is 100 vol %.

4. The ceramic capacitor as claimed in claim 1, wherein the main component is barium titanate.

* * * * *